Figure 1:
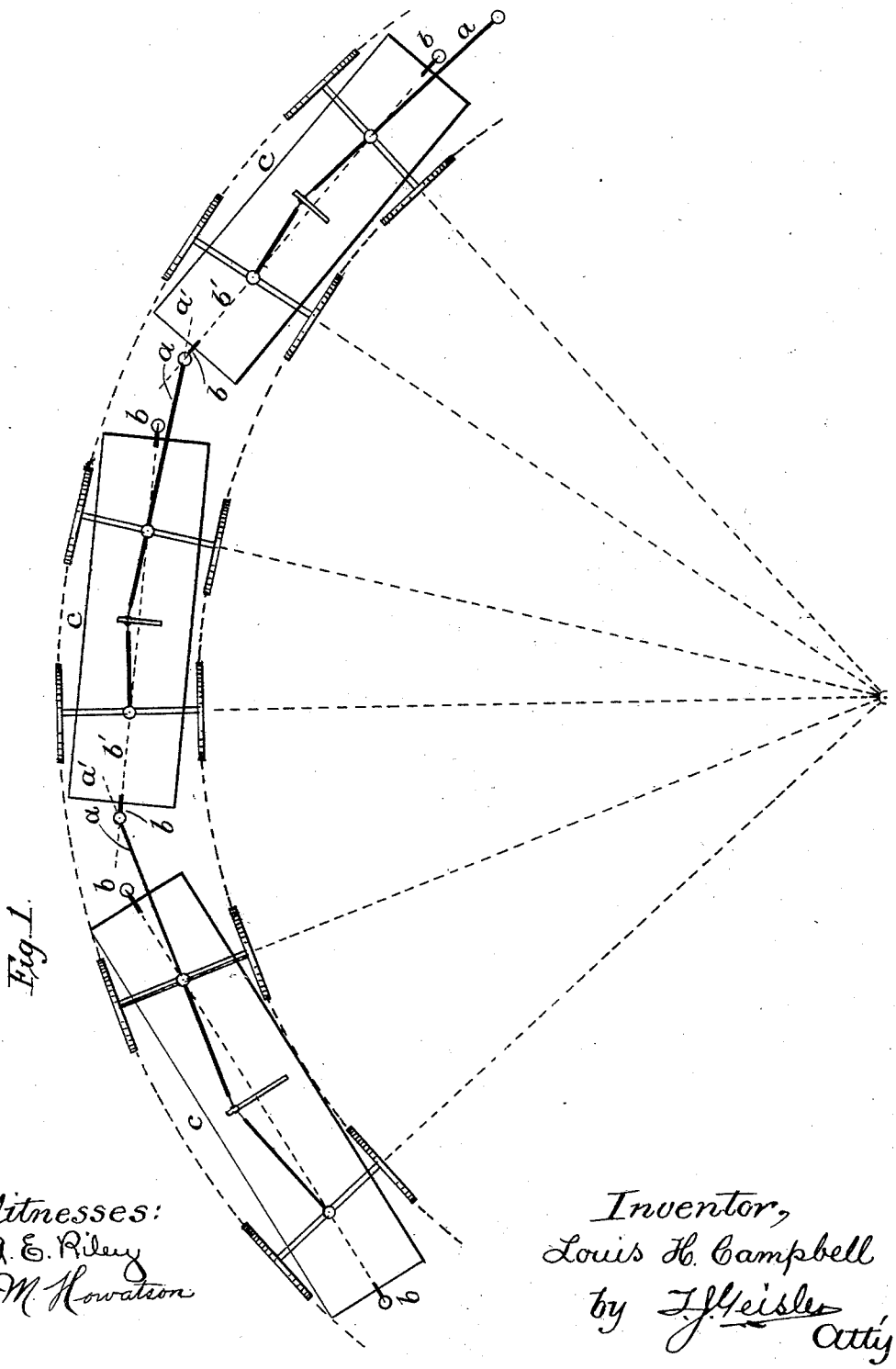

No. 717,163. Patented Dec. 30, 1902.
L. H. CAMPBELL.
ROAD VEHICLE COUPLING.
(Application filed Dec. 30, 1901.)

(No Model.) 5 Sheets—Sheet I.

Witnesses:
A. E. Riley
E. M. Howatson

Inventor,
Louis H. Campbell
by T. J. Geisler
Atty.

No. 717,163. Patented Dec. 30, 1902.
L. H. CAMPBELL.
ROAD VEHICLE COUPLING.
(Application filed Dec. 30, 1901.)

(No Model.) 5 Sheets—Sheet 3.

Witnesses:
A. E. Riley.
E. M. Howatson

Inventor;
Louis H. Campbell
by T. J. Geisler atty.

No. 717,163. Patented Dec. 30, 1902.
L. H. CAMPBELL.
ROAD VEHICLE COUPLING.
(Application filed Dec. 30, 1901.)

(No Model.) 5 Sheets—Sheet 5.

Inventor
Louis H. Campbell

Witnesses

By
Attorney

UNITED STATES PATENT OFFICE.

LOUIS H. CAMPBELL, OF PORTLAND, OREGON.

ROAD-VEHICLE COUPLING.

SPECIFICATION forming part of Letters Patent No. 717,163, dated December 30, 1902.

Application filed December 30, 1901. Serial No. 87,812. (No model.)

*To all whom it may concern:*

Be it known that I, LOUIS H. CAMPBELL, a citizen of the United States, and a resident of Portland, in the county of Multnomah and State of Oregon, have invented a new and useful Improvement in Road-Vehicles to be Coupled in Train, of which the following is a specification, reference being had to the accompanying drawings as constituting a part thereof.

My invention relates to that class of road-vehicles which are intended to be coupled in a train of some length for hauling passengers or freight over ordinary country roads. The utility of such means of transportation has become well recognized as affording the means for tapping and connecting with the railroad highway sections of country otherwise more or less isolated; but heretofore no trailing wagon was known which was equipped with the necessary means for so automatically guiding its wheels that the vehicles when coupled in train would faithfully follow in each other's track whether the road had a descending or ascending grade and regardless of its winding curves. In other words, it is absolutely essential that the path over which the trailing vehicles will pass shall be determined with sufficient exactness for all practical purposes by the guidance of the front wheels of the leading vehicle providing the motive power, for unless the steering or guiding devices of the vehicles are dependable in this respect such vehicles are useless for coupling into trains of any length, as the same could not be safely hauled over narrow or tortuous roads.

Hence the object of my invention is to provide the necessary means whereby all the wheels of the vehicles throughout the length of the train shall be controlled by the guidance of the leading pair of wheels of the leading vehicle and by which means the positions assumed by the axles of such leading pair of wheels, being a radius of the curve described while passing over a winding stretch of road or avoiding an obstruction, shall be automatically and progressively communicated to the axles of the following pairs of wheels, so that they will closely follow the action of said leading wheels, making a curve at the particular part of the road where the leading wheels were guided to make a curve.

It was also my object to so construct the steering and coupling devices of my vehicles that the same should be unaffected by the end thrust of one vehicle upon another while on a downgrade.

The devices which may be employed for carrying out the objects of my invention are variable. The principles governing such means are, however, fully illustrated by the accompanying drawings, referred to as a part of this specification.

Figure 2:
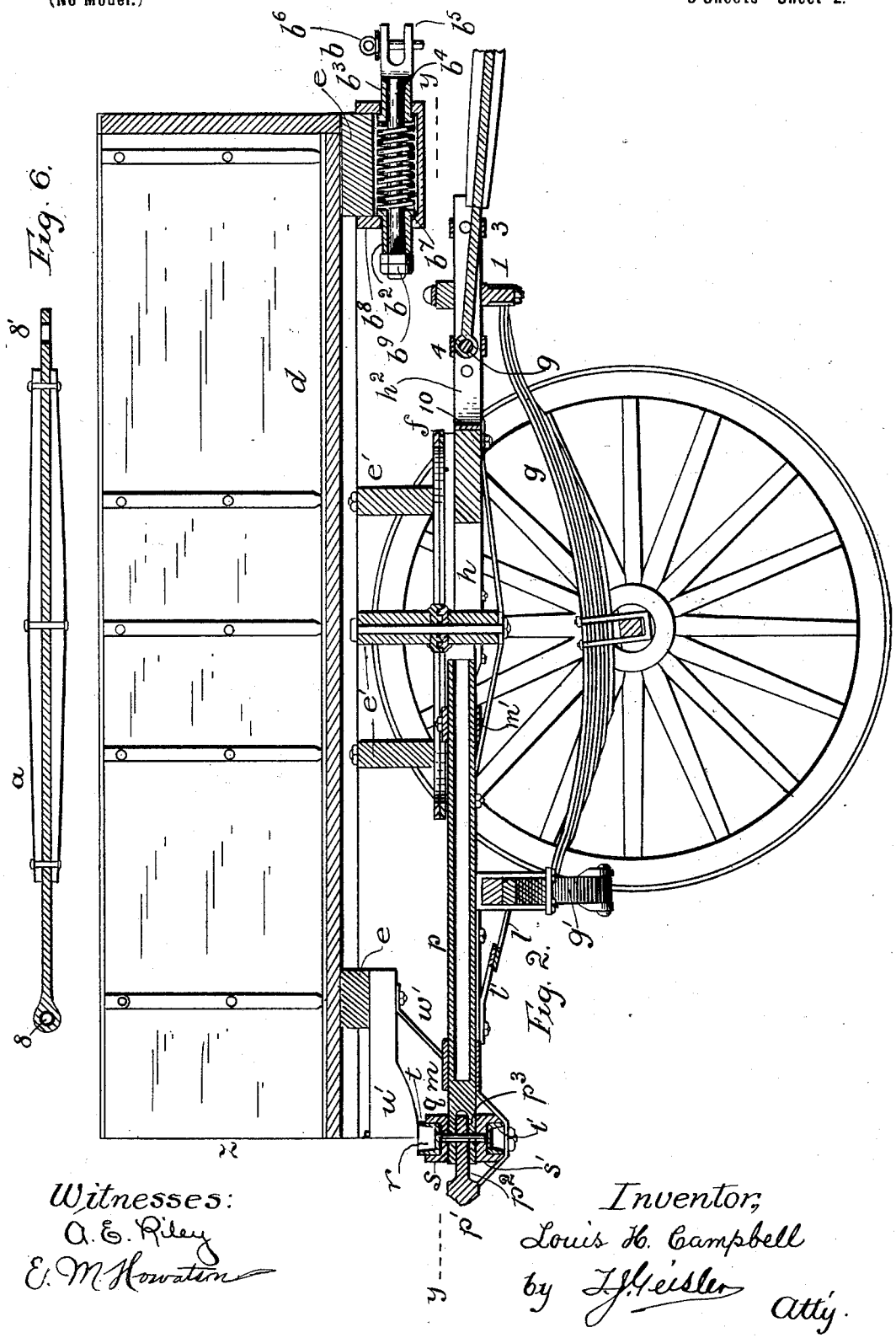
Figure 3:
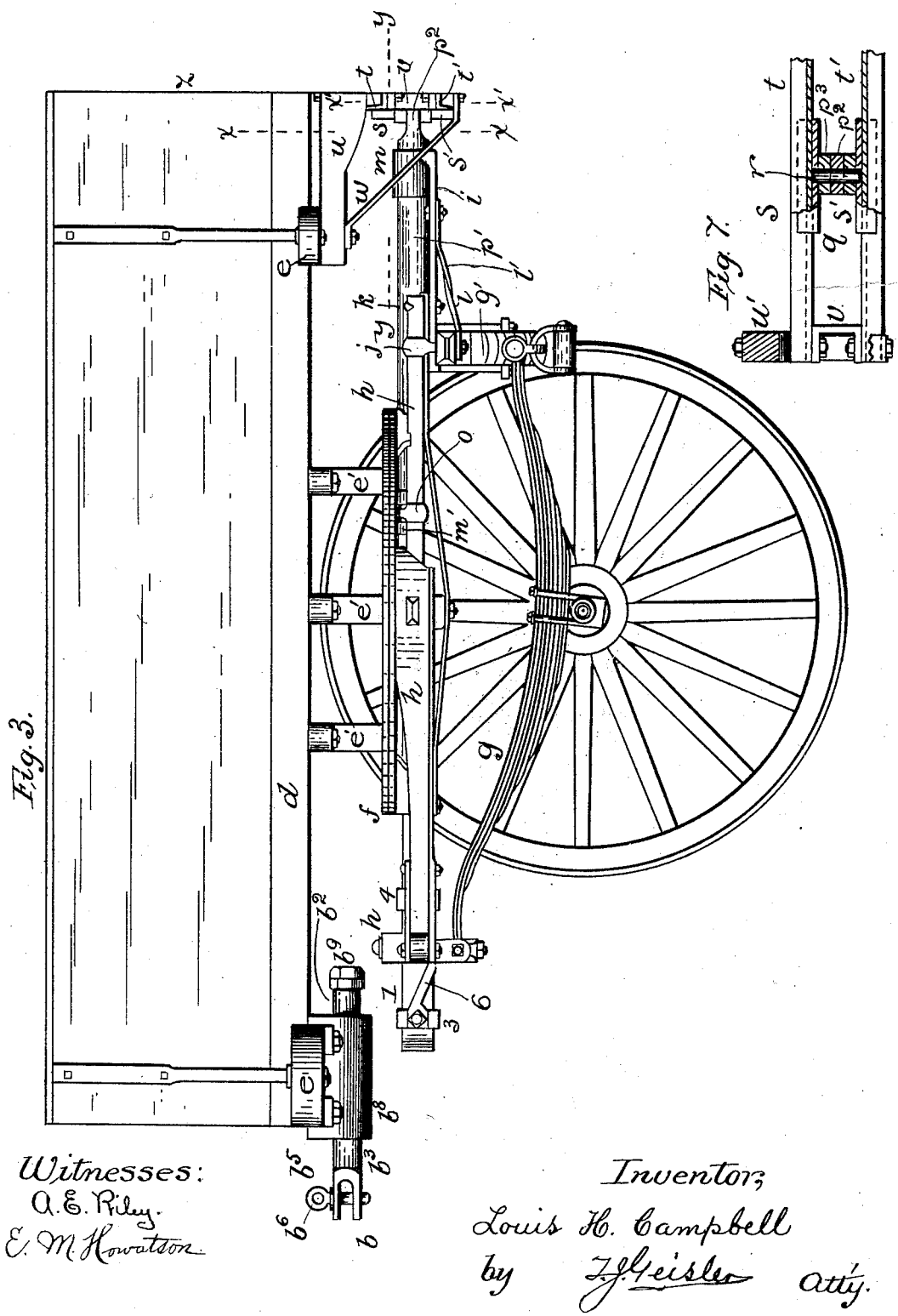
Figure 4:
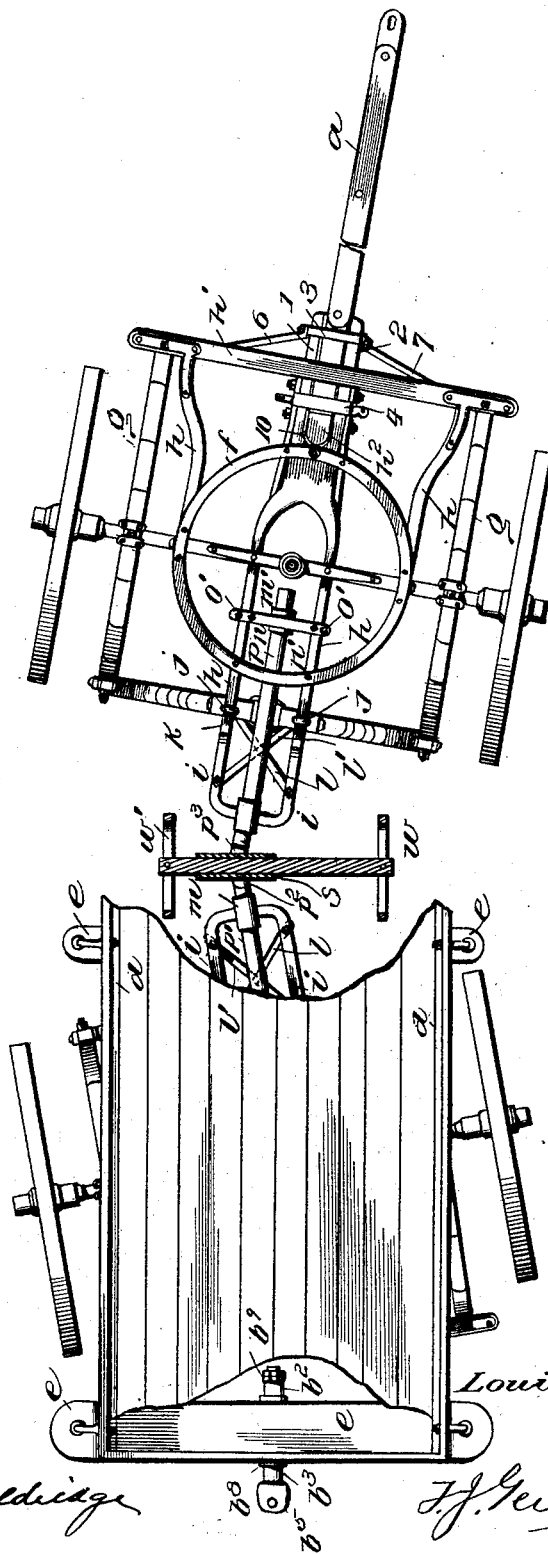
Figure 5:
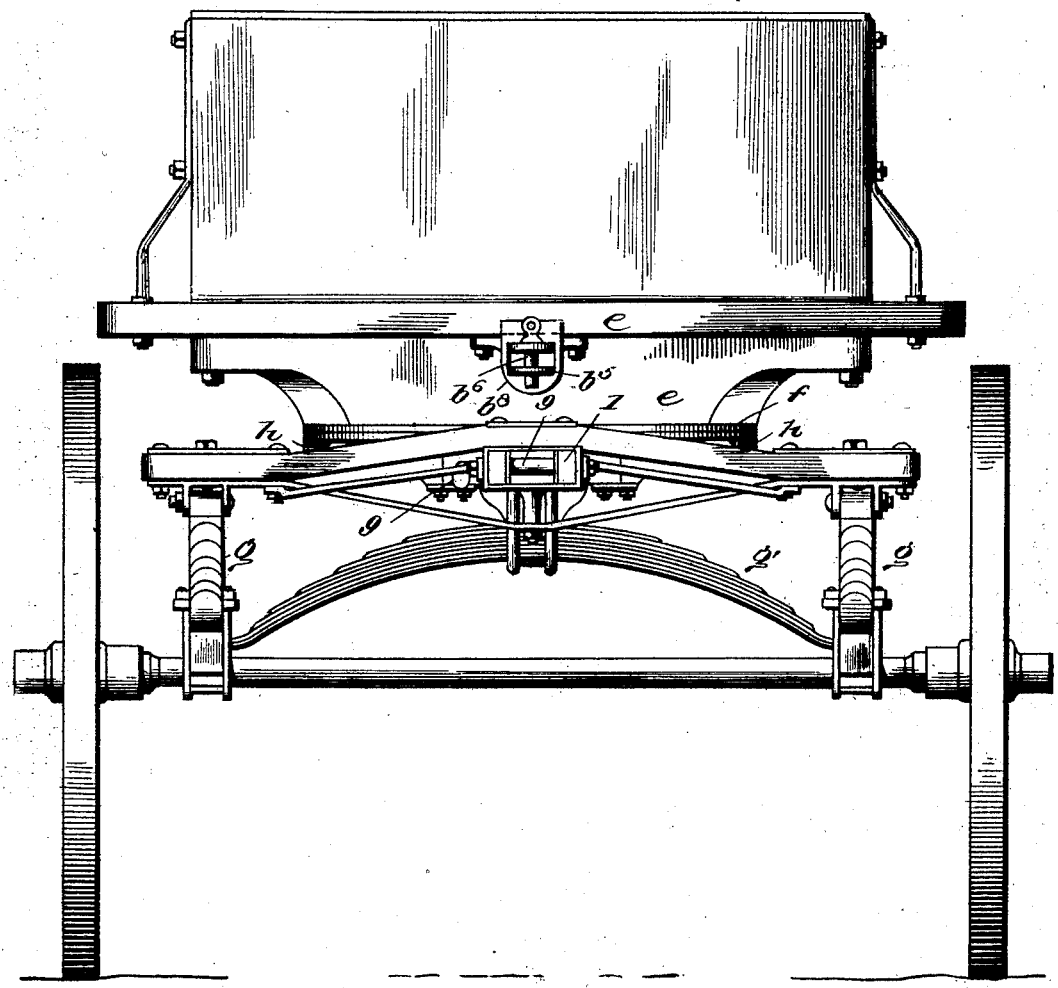

In the drawings, Figure 1 is a diagrammatic illustration of a train of road-vehicles provided with suitable running-gear and coupling means adapting the vehicles to carry out the purposes of my invention, the train being so placed as if about rounding a curve the center of which is at the point of convergence of the radial broken lines. The arc or curve is also represented by two concentric broken curved lines. The coupling and steering devices of the vehicles are designated by the letters $a\ b\ p\ p'$ and the vehicle-bodies by the letter $c$. Fig. 2 is a longitudinal section of the forward half of a vehicle equipped with the described means, the section being approximately taken at the center of the vehicle and the running-gear being positioned as if running on a straight course. Fig. 3 is a side elevation of the rear half of the same vehicle. Hence Figs. 2 and 3, taken together, represent a complete vehicle divided on a line $z$. In Fig. 2, however, a complete longitudinal section is shown of the cross-head $q$ for guiding the jointed ends of the steering-bars $p\ p'$ of the running-gear. Fig. 4 is a plan or top view of the same vehicle on a reduced scale, the forward portion being a plan section on the line $y\ y$ of Figs. 2 and 3 and the axles of the vehicle being positioned as if rounding a curve. Fig. 5 is an elevation of one end of a vehicle with the draw-bar removed. The opposite end is a duplicate of the one shown. Fig. 6 is a section of one of the draw-bars, and Fig. 7 is a cross-section taken on a line $x\ x$ of Fig. 3 and in part on the line $x'\ x'$ of the same figure.

The letters and numerals designate the parts referred to in the following description.

Two rules of construction are necessarily followed. The first is that the front and rear wheels of the vehicle must be so controlled by automatic steering devices that their axles will at all times be correctly positioned, either on parallel lines or coincident with the radii of a curve. Each axle is attached to the vehicle-body by a pivoted frame, and the axles are disposed equidistant from the center of the vehicle. The second rule governs the coupling of the vehicles together. Referring to Fig. 1, such coupling consists of a draw-head $b$, rigidly projecting from the rear end of the body of the leading vehicle, and a draw-bar $a$, projecting from the axle of the front pair of wheels of the following vehicle. The draw-bar $a$ guides said front axle of the following vehicle in the usual way. The free ends of such draw-head and draw-bar are adapted to be jointly connected, and the point of this joint must be arbitrarily determined, as follows: The pivotal points of the front and rear axles of two vehicles to be coupled together must be placed on the arc of a circle with the vehicles a desired distance apart. The length of the radius of the arc is immaterial; but for convenience it is best to use as a standard a curve or arc of the shortest practicable radius. A right or straight line $b'$ is then drawn through the pivoting-points of the two axles of the leading wagon, and the tangential line $a'$ is drawn from the pivotal point of the front axle of the following vehicle. The tangential line $a'$ would thus be a line projecting at right angles from the pivotal point of said front axle, said axle being placed coincident with the radius of the curve or arc. Both lines $a'$ $b'$ are then continued until they intersect, and the point of their intersection determines the required length of the draw-head $a$ and fixes, besides, the point of pivotal connection between said draw-bar and said draw-head. This described arrangement of the coupling for my vehicles must be carefully observed; otherwise the following vehicle will not track after the leading vehicle. That this is true is quite evident, for if the draw-bar $a$ is not of proper length the front axle of the following vehicle will be turned too much in one direction or the other. The same is true if the point of pivotal connection of such draw-bar with the body of the leading vehicle be not fixed according to the rule stated. Either condition would cause the following vehicle while traveling on a curve to make either too long or too short a curve, and this of course would prevent the control of the following vehicle by the management of the leading vehicle, as is designed to be done by me.

Referring now to the details of construction of my vehicle, as shown in the drawings, the vehicle-body consists of a frame comprising sills $d$ $e$ and body-pieces $e'$, resting on the turn-tables or fifth-wheel $f$ of the running-gear. The axles for each pair of wheels are suspended by the usual platform-gear, comprising truss-frames $h$ and springs $g$, $g$, and $g'$—as, for example, in the well-known Sell's vehicle-gear. To the inner ends of the truss-frames are attached U-shaped members $i$, secured in place by clips $j$, hook-headed bolts $k$, and braces $l$ $l'$. $m$ $m'$ are boxes, the former being an integral part of the said U-shaped members $i$ and the latter having laterally-projecting portions $n$ $n'$, which projecting portions are secured to the truss-frame by clips $o$, the bolts $o'$ of such clips being seen in Fig. 4. In the boxes $m$ $m'$ are held the cylindrical bars $p$ $p'$, having heads $p^2$ $p^3$ respectively adapted to be pivotally connected by a pin $r$. With the exception of the heads $p^2$ $p^3$ of said cylindrical bars $p$ $p'$ the construction of the running-gear of the vehicle is alike for both pair of wheels. The pin $r$, connecting said heads of the cylindrical bars $p$ $p'$, is carried in a cross-head $q$, Fig. 7, constructed of two flanged plates $s$ $s'$, sliding on transversely-secured channel guide-bars $t$ $t'$. The guide-bars $t$ $t'$ are secured under the vehicle-body by brackets $u$ $u'$, blocks $v$, and braces $w$ $w'$. The flanged plates $s$ $s'$ have perforations centrally located to receive the ends of the pin $r$, such pin ends abutting against the guide-bars $t$ $t'$.

The forward end of the truss-frame $h$ (seen in Fig. 2) shows one of the sockets in which to secure one end of the draw-bar $a$. The running-gear of the vehicle is provided at each end with a socket in which to insert the draw-bar when coupling vehicles together. Such sockets respectively comprise two members 1 2, being portions of the truss-frame and being braced by yokes 3 and 4, the yoke 3 being connected by braces 6 and 7 with the cross-bar $h'$ of the truss-frame. The yoke 4 is perforated to receive the horizontal toggle-ended coupling-pin 9. The toggle end of such coupling-pin operates to hold such pin against lateral displacement. The inner surfaces of the socket $h^2$ are faced with an iron chafing-plate 10. The yoke 3 is adapted to allow the projecting end of the draw-bar $a$ limited vertical motion, so as to compensate for any unevenness of the road-surface, and the bars $p$ $p'$ being adapted to allow the boxes $m$ $m'$ to rotate about them, thus compensating for any transverse unevenness in the road-surface. The shank $b^4$ of the draw-head $b$ is constructed on the same principle. As shown in Fig. 6, the draw-bar $a$ is constructed of a bar of iron having pin-holes 8 8' and stiffened by a facing of wood. The yoke 4 is placed some distance from the inner end of the draw-bar socket $h^2$, so that when the pin 9 is removed the draw-bar may be moved farther into the socket to facilitate the uncoupling and coupling of vehicles without moving the same, as will be seen.

Each end of the vehicle-body is also provided with a fixed draw-head $b$. The construction of such draw-head is designed to ease the jar on the draft-gear. It consists of a box $b^8$, having annular apertures in its two ends, in which are loosely contained the sleeves $b^2$ $b^3$, having flanged heads restraining them within the box. In the said sleeves is inserted the shank $b^4$ of the draw-head. Said shank is threaded at the inner end to receive lock-nuts $b^9$ and has a forked head $b^5$, apertured to receive a coupling-pin $b^6$. On the said shank between the flange-heads of said sleeves is a coil-spring $b^7$.

By reason of the draw-bar $a$ being longitudinally movable in its socket after having withdrawn the coupling-pins 9 and $b^6$ it is an easy matter to uncouple two vehicles without moving the latter, and then the draw-bar may be changed to couple the vehicles so as to be adapted to travel in an opposite direction. As the vehicles are shown coupled in the diagram, Fig. 1, they are supposed to be traveling to the right. The draw-bars $a$ will have to be reversed if required to travel to the left. When two vehicles are coupled together, the draw-bar provides the means for steering the forward wheels of the following vehicle, and whatever position is assigned to such forward axle the same will be relatively communicated to the axle at the opposite end of the vehicle and by the steering-bars $p$ $p'$, and in whatever position the axles may be turned the jointed connection of said steering-bars $p$ $p'$ is constantly maintained in the center of the vehicle, thus keeping both steering-bars of equal length and causing the position of the forward axle to be faithfully communicated to the rear axle.

In the drawings the means provided at the rear end of the body of the leading vehicle for having coupled thereto the tongue of the following vehicle is represented as a drawhead. I do not limit myself to such, however. Any other means for coupling will answer. Only the point where such tongue is required to be pivotally connected to the body of the forward vehicle must be determined by the rule already stated.

Having fully described my invention, now what I claim, and desire to secure by Letters Patent, is—

1. The combination in a train of vehicles with the running-gear thereof comprising front and rear pivoting axles; and a connection between said axles, operating to position one thereof relatively to the other; of a coupling for said vehicles consisting of a draw-bar, or tongue, projecting at right angles from the forward axle of the following vehicle, and steering said axle; and the extremity of which draw-bar, or tongue, is pivotally connected to the rear end of the body of the leading vehicle, the point of such pivotal connection being fixed at the point of intersection of a line, $b'$, drawn across the pivoting-points of the front and rear axles of the leading vehicle, with a line, $a'$, corresponding to the said draw-bar, or tongue, while all the axles of the coupled vehicles are arranged coincident with the radii of a curve, or arc, substantially as described.

2. The combination in a train of vehicles with the running-gear thereof comprising front and rear pivoting axles; and a connection between said axles, operating to position one thereof relatively to the other; of a coupling for said vehicles consisting of a removable draw-bar, or tongue, projecting at right angles from the forward axle of the following vehicle, and steering said axle, and the extremity of which draw-bar, or tongue, is pivotally connected to the rear end of the body of the leading vehicle, the point of such pivotal connection being fixed at the point of intersection of a line $b'$, drawn across the pivoting-points of the front and rear axles of the leading vehicle, with a line, $a'$, corresponding to said draw-bar, or tongue, while all the axles of the coupled vehicles are arranged coincident with the radii of a curve, or arc; and the said vehicles and said couplings being also adapted to allow the coupling thereof to be changed about, substantially as set forth, so that the vehicle-train may be hauled in either direction.

3. The combination in the running-gear of a vehicle of the class mentioned, with front and rear pivoting axles, of longitudinally-extensible steering-bars, projecting inwardly from said axles; a steering draw-bar, or tongue, projecting from the front axle, and a crosshead sliding transversely in suitable bearings under the center of the vehicle-body, to which cross-head the inner extremities of said steering-bars are pivotally connected; said cross-head operating to maintain the pivotal point of the intermediate jointure of the steering-bars equidistant from the axles, so that the position of the front axle of the vehicle will be truly communicated to the rear axle, and that when the front wheels of the vehicle are guided over a curve, the rear axle as well as the front axle will be positioned coincident with the radii of such curve, substantially as set forth.

4. The combination in the running-gear of a vehicle of the class mentioned of pivoting truss-frames for the front and rear axles, boxes, $m$, $m'$, on said truss-frames, steering-bars, $p$, $p'$, longitudinally slidable in said boxes, and provided with extremities adapted to be jointedly united; guides secured transversely under the center of the vehicle-body; and a cross-head in said guides, to which cross-head the extremities of the said steering-bars are connected; the boxes, $m$, $m'$, of the truss-frames allowing the latter to accommodate themselves to any transverse unevenness in the road-surface without straining the said intermediate steering mechanism of the axles, substantially as described.

5. The combination in a train of vehicles, the running-gear of which comprises front and rear pivoting axles, and connections between said axles operating to position one thereof relatively to the other; of the coupling for the vehicles comprising a draw-head, secured to the end of the body of the leading vehicle and provided with a coupling-shank, $b^4$, longitudinally vibratable and also rotatable; and a draw-bar, or tongue, projecting at right angles from the front axle of the following vehicle, the extremity of said draw-bar, or tongue, being pivotally connected to the said shank of the draw-bar, and the point of such pivotal connection being fixed at the point of intersection of a line, $b'$, drawn across the pivoting-points of the front and rear axles of the leading vehicle, with a line, $a'$, corresponding to said draw-bar, or tongue, while all the axles of the coupled vehicles are arranged coincident with the radii of a curve, or arc, substantially as described.

In testimony whereof I have hereunto affixed my signature, in the presence of two witnesses, this 2d day of December, 1901.

LOUIS H. CAMPBELL.

Witnesses:
T. J. GEISLER,
JNO. JENNIE.